(12) United States Patent
Rothschild

(10) Patent No.: US 11,007,450 B2
(45) Date of Patent: May 18, 2021

(54) SYSTEM AND METHOD FOR IDENTIFYING BUILDING BLOCKS AND THEN DISPLAYING ON A SMART DEVICE THE CORRECT AND/OR ALTERNATIVE WAYS TO ASSEMBLE THE BLOCKS

(71) Applicant: Leigh M. Rothschild, Miami, FL (US)

(72) Inventor: Leigh M. Rothschild, Miami, FL (US)

(*) Notice: Subject to any disclaimer, the term of this patent is extended or adjusted under 35 U.S.C. 154(b) by 122 days.

(21) Appl. No.: 15/170,953

(22) Filed: Jun. 2, 2016

(65) Prior Publication Data
US 2017/0173486 A1 Jun. 22, 2017

Related U.S. Application Data

(60) Provisional application No. 62/270,591, filed on Dec. 22, 2015.

(51) Int. Cl.

| | | |
|---|---|---|
| A63H 33/04 | (2006.01) | |
| G06K 9/00 | (2006.01) | |
| G06K 9/62 | (2006.01) | |
| G09B 19/00 | (2006.01) | |
| A63H 33/06 | (2006.01) | |
| A63H 33/08 | (2006.01) | |
| G09B 5/06 | (2006.01) | |
| G06F 3/0488 | (2013.01) | |
| G06F 3/16 | (2006.01) | |
| G06F 3/0484 | (2013.01) | |

(52) U.S. Cl.
CPC ........... *A63H 33/042* (2013.01); *A63H 33/06* (2013.01); *A63H 33/086* (2013.01); *G06K 9/00671* (2013.01); *G06K 9/6215* (2013.01); *G09B 5/06* (2013.01); *G09B 19/00* (2013.01); *G06F 3/04847* (2013.01); *G06F 3/04883* (2013.01); *G06F 3/167* (2013.01)

(58) Field of Classification Search
CPC ............................. A63H 33/04; A63H 33/042
USPC .......................... 446/91, 117, 124, 175, 484
See application file for complete search history.

(56) References Cited

U.S. PATENT DOCUMENTS

| | | | | |
|---|---|---|---|---|
| 8,257,157 | B2* | 9/2012 | Polchin | A63F 13/02 |
| | | | | 463/9 |
| 9,914,066 | B2* | 3/2018 | Cletheroe | A63H 33/042 |
| 2002/0196250 | A1* | 12/2002 | Anderson | G06T 19/00 |
| | | | | 345/420 |
| 2010/0001923 | A1* | 1/2010 | Zilber | A63F 3/00643 |
| | | | | 345/1.1 |
| 2011/0074833 | A1* | 3/2011 | Murayama | A63H 33/042 |
| | | | | 345/690 |
| 2012/0258436 | A1* | 10/2012 | Lee | G09B 19/00 |
| | | | | 434/362 |

(Continued)

*Primary Examiner* — Kurt Fernstrom

(57) ABSTRACT

A system, method, and device for identifying building blocks and suggesting ways to assemble the identified blocks are described. The method comprises of capturing, by an electronic device, one or more images of one or more building blocks. An identification information is determined related to each of the one or more building blocks based on the captured one or more images. Each of the one or more building blocks is identified based on the corresponding identification information. Then, instructions for combining the one or more building blocks are determined. Finally, the one or more instructions for utilizing the one or more building blocks are provided on the electronic device.

28 Claims, 5 Drawing Sheets

(56) References Cited

U.S. PATENT DOCUMENTS

| | | | |
|---|---|---|---|
| 2013/0217295 A1* | 8/2013 | Karunaratne | A63H 33/086 446/124 |
| 2014/0127965 A1* | 5/2014 | Adam | A63H 33/042 446/91 |
| 2016/0101370 A1* | 4/2016 | Madsen | A63H 33/042 446/91 |

* cited by examiner

SYSTEM AND METHOD FOR IDENTIFYING BUILDING BLOCKS AND THEN DISPLAYING ON A SMART DEVICE THE CORRECT AND/OR ALTERNATIVE WAYS TO ASSEMBLE THE BLOCKS

CROSS-REFERENCE TO RELATED PATENT APPLICATION

The present application is related to and claims priority of U.S. provisional patent application titled "System and Method for identifying building blocks and then displaying on a smart device the correct and/or alternative ways to assemble the blocks", Ser. No. 62/270,591, filed on Dec. 22, 2015, the description of the same is incorporated herein in its entirety.

FIELD OF THE DISCLOSURE

The presently disclosed embodiments are generally related to identification of building blocks, and more particularly to identification of building blocks and then displaying on a smart device the correct and/or alternative ways to assemble the building blocks.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Each year millions of toy building blocks are sold and assembled by children and adults alike. Examples of some products that use building blocks include Lego® sets and MegaBloks®. Both of these companies sell millions of packages per year that contain billions of building blocks which can be assembled by a user to create a construction object. Many of these packages contain instructions; however, there may be cases where such instructions may not be comprehensible due to various factors such as language barriers, misprinting, illegible instructions, and the like. In such scenarios, the user may not be able to identify the building block. Further, in such scenarios, the user may not be able to determine the structural arrangement in which to arrange one or more building blocks to construct the construction object.

In certain other scenarios, the instructions corresponding to assembling the building blocks in one or more optimized structural configurations may be available to the user. Similarly, in certain other scenarios, the instructions may not be available for constructing one or more other construction objects apart from the one for which the instructions are provided. It is because of such limitations imposed due to incomprehensible instructions, the companies are forced to offer tech support services along with the packages. Further, such limitations also lead to loss of business due to customer dissatisfaction.

Hence, there exists a need for accurately identifying the building blocks in order to correctly assemble the construction object. Further, the need exists to apprise the user of the one or more optimized structural configurations for assembling the building blocks to create the construction object. Additionally, it is also preferred to inform the user about the one or more alternative ways of using the building blocks to create one or more construction products.

BRIEF SUMMARY

It will be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

In an example embodiment, a system for identifying building blocks and suggesting ways to assemble the identified blocks is described. The system may comprise of an electronic device and a processing module. The electronic device may be adapted to capture one or more images of one or more building blocks. Further, the electronic device may resolve identification information corresponding to each building block, and output one or more instructions for utilizing the one or more building blocks. The processing module may be communicatively coupled with the electronic device. It may be noted that the processing module may be a processor contained in the electronic device itself or alternatively may be a server communicatively coupled with the electronic device. The processing module may be adapted to receive identification information corresponding to each building block; identify each of the one or more building blocks based on the received identification information; determine one or more instructions for utilizing the one or more building blocks; and finally transmit the one or more instructions for utilizing the one or more building blocks to the electronic device.

In an example embodiment, a method for identifying building blocks and suggesting ways to assemble the identified blocks is described. The method may comprise the steps of capturing one or more images of one or more building blocks by an electronic device. An identification information related to each of the one or more building blocks is determined based on the captured one or more images. Each of the one or more building blocks are then identified based on the corresponding identification information. Subsequently, one or more instructions for utilizing the one or more building blocks are determined. Finally, the one or more instructions for utilizing the one or more building blocks are provided on the electronic device.

In an example embodiment, an electronic device for identifying building blocks and suggesting ways to assemble the identified blocks is described. The electronic device may comprise an image capturing module, a communication module, a central computing processor, and an input/output (I/O) module. The image capturing module may be adapted for capturing one or more images of a building block. The communication module may be adapted for transmitting an identification information related to the building block based on the captured one or more images. The central computing processor may be adapted for identifying the building block by comparing the identification information related to the one or more images with the identification information pre-stored in a memory communicatively coupled with the electronic device; and determining one or more instructions for utilizing the one or more building blocks. The input/ output (I/O) module is adapted for rendering the instructions corresponding to the building block.

BRIEF DESCRIPTION OF THE DRAWINGS

The accompanying drawings illustrate various embodiments of systems, devices, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
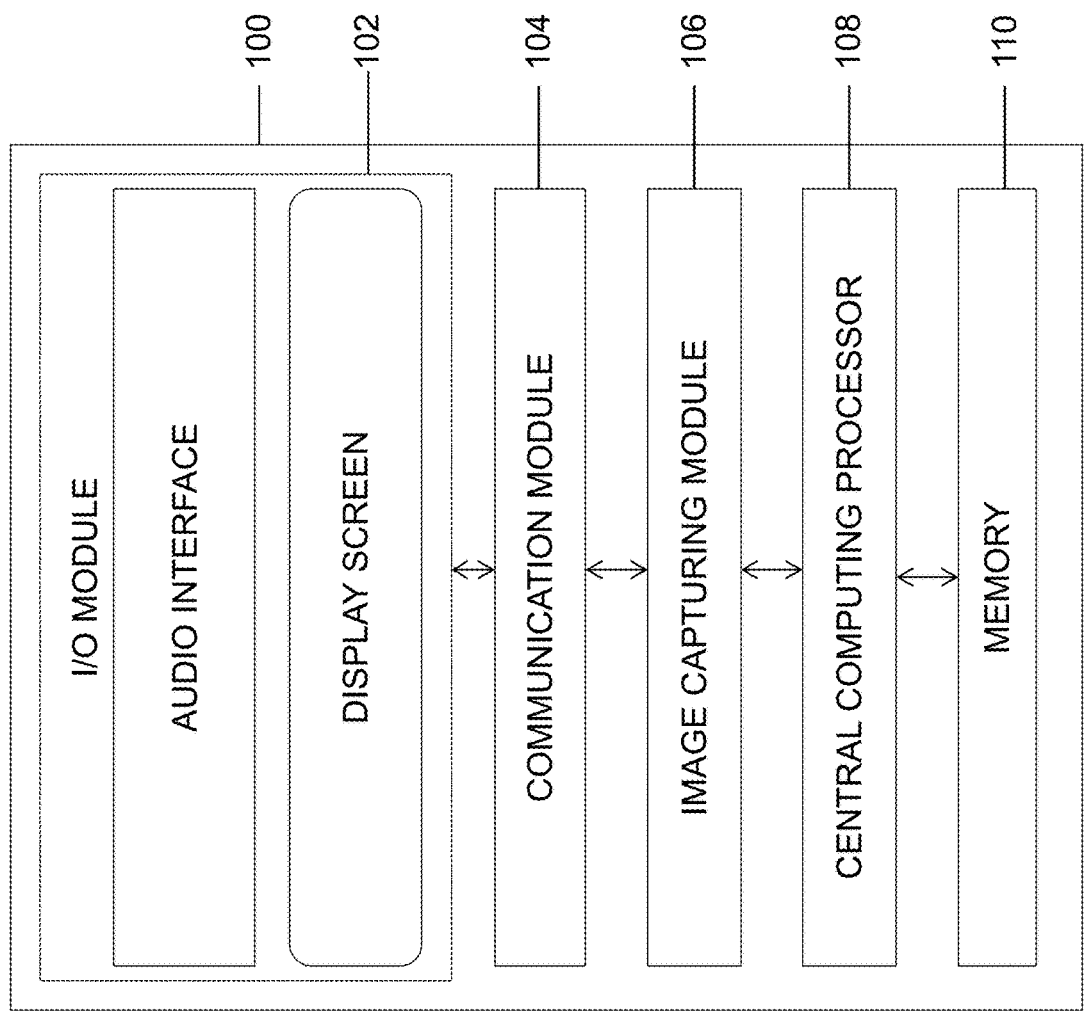
FIG. 1 illustrates a device for identifying building blocks and suggesting ways to assemble the identified blocks, according to an example embodiment.

FIG. 1 illustrates a device for identifying building blocks and suggesting ways to assemble the identified blocks, according to an example embodiment. The electronic device 100 may be a Personal Digital Assistant (PDA) device, or a personal computer, or a laptop, or a tablet, or a mobile phone and the like. The electronic device 100 may include an input/output (I/O) module 102, a communication module 104, an image capturing module 106, a central computing processor 108, and a memory 110. In an aspect, the I/O module 102 may comprise an audio interface and a display screen. It should be noted that the building blocks may be MegaBlocks™, Lego™, or any other type of Construction set toys, or may also be building materials such as bricks, mortar, steel bars, wood etc, used in real world construction projects.

The I/O module 102 is enabled to output certain data and may also enable a user to input certain data and instructions. The display screen may be configured to display information received by the communication module 104. The display screen may include any of a variety of user interface components. The display screen may include a liquid crystal display (LCD) display, a cathode ray tube (CRT) display, a plasma display, or another type of displays. As another example, the display screen may be integrated with an input unit and include a data entry component, such as a keyboard in a QWERTY keyboard arrangement, a touch screen such as a resistive or capacitive touch screen, or another type of data entry component. In an aspect, the I/O module 102 may include an input unit for providing identification of one or more building blocks to the remote server for creating a repository of the identification information of a plurality of building blocks. The input unit may act as a data entry component, such as a keyboard in a QWERTY keyboard arrangement, a touch screen such as a resistive or capacitive touch screen, a voice recognition interface, or another type of data entry component. The I/O module 102 may further comprise an audio interface that may enable rendering audio based one or more instructions received from the remote server.

The various components of electronic device 100 may be communicatively coupled with each other by means of a bus or a network of cables in a desired configuration. In one aspect, the various components may also be embedded on a single circuit board. The image capturing module 106 may enable capturing images of one or more building blocks. For capturing the images of the building blocks, the image capturing module 106 may include, but is not limited to, charged coupled devices (CCD), infrared imaging devices, and electro-optical sensing devices. The image capturing module 106 may be further configured to process a symbology associated with the building blocks, such as, a bar code, a Quick Response (QR) code, Radio Frequency identification (RFID).

Additionally, a communication module 104 may also be provided with the electronic device 100. The communication module 104 may be communicatively coupled with one or remote servers. In an aspect, the communication module 104 may transmit the one or more images captured by the image capturing module 106 to the one or more remote servers for identification. In another aspect, the communication module 104 may transmit identification information such as a decode string to the one or more remote servers for identification. The decode string for one or more images may be resolved according to the methods described in U.S. Pat. No. 8,936,190 invented by Leigh M Rothschild the inventor of the present application and using proprietary algorithms, and has been incorporated by reference herein in its entirety. The communication module 104 may also enable receiving identification information from the remote server based on comparison of the transmitted one or more images of the building blocks with the one or more images stored at the remote server. The communication module 104 may also enable transmitting first set of user inputs corresponding to the received identification information rendered on the display of the electronic device 100. The communication module 104 may also enable reception of one or more instructions from the remote server, corresponding to the transmitted first set of user inputs. The received data and instructions may then be stored in the memory 110.

In an aspect, the remote server may compare the received one or more images of the building blocks with one or more images stored at a database associated with the remote server. The remote server may further determine identification information corresponding to the one or more building blocks based on the comparison. The communication module 104 may receive the determined identification information from the remote server.

The remote server may determine one or more instructions corresponding to the first set of user inputs received from the electronic device 100. The one or more instructions may correspond to directions for utilizing the building block. The communication module 104 may receive the determined one or more instructions from the remote server. Such received one or more instructions may be rendered on the electronic device 100 by the I/O module 102. The rendering of the received one or more instructions may be based on a combination of one or more of a video, an audio, one or more images, an animation, or a haptic feedback. In an aspect, the one or more instructions correspond to one or more other building blocks to be used subsequent to the building block for constructing the construction objects, a sequence of the one or more other building blocks for constructing a construction object, one or more other construction objects that can be assembled using the building block.

In another aspect, the central computing processor 108 may compare the one or more images of the building blocks captured based on the image capturing module 106. Further, the one or more images used for comparison may be stored in the memory 110 of the electronic device 100. The central computing processor 108 may further determine identification information corresponding to the one or more building blocks based on the comparison and image processing algorithm that may be stored in the memory 110. The determined identification information may comprise identity of the building block, identity of the one or more construction objects, such as by example and not limited to a fire house, or a hospital, or a skyscraper, that can be constructed by assembling the one or more building blocks. The identification information may further comprise one or more structural arrangements, such as a firehouse with multiple designs including multiple fascias, and multiple colours, and other possible design permutations for using the building block. The identification information may further comprise one or more web Universal Resource Locator (URL) address for retrieving more information of the building blocks. The identification information may further comprise an alternative construction apart from a desired construction object being assembled by the user, based on the identification of the building block.

The central computing processor 108 may execute computer program instructions stored in the memory 110. The central computing processor 108 may also be configured to decode and execute any instructions received from the remote server. The central computing processor 108 may also execute a client application for desired functioning of the electronic device 100. The central computing processor 108 may include one or more general purpose processors (e.g., INTEL microprocessors) and/or one or more special purpose processors (e.g., digital signal processors). The central computing processor 108 is configured to execute one or more computer-readable program instructions, such as program instructions to carry out any of the functions described in this description.

The memory 110 may include a computer readable medium. A computer readable medium may include volatile and/or non-volatile storage components, such as optical, magnetic, organic or other memory or disc storage, which may be integrated in whole or in part with a processor, such as central computing processor 108. Alternatively, the entire computer readable medium may be remote from central computing processor 108 and coupled to central computing processor 108 by connection mechanism and/or network cable. In addition to memory 110, there may be additional memories that may be coupled with the central computing processor 108.

The electronic device 100 enables identifying building blocks suggesting ways to assemble the identified blocks. The image capturing module 106 may enable capturing one or more images of a building block. In an aspect, the image capturing module 106 may enable capturing one or more images of an assemblage of building blocks.

A person of ordinary skill in the art will appreciate that the building blocks may correspond to a group of blocks that can be assembled in a predefined orientation to create one or more construction objects. A single building block is adapted to be connected with one or more blocks by means of a coupling system such as stud-and-tube coupling system. Examples of the building blocks may include, Lego block Sets®, bricks, mortar, hinges, and the like. Building blocks may be coupled with each other for assembling a plurality of construction objects. The one or more construction objects are structures such as fire house, or a hospital, or a skyscraper that can be constructed by assembling the building block.

The I/O module 102 may enable rendering of the determined identification information on the electronic device 100. The determined identification information may correspond to the identification information received by the communication module 104. In an aspect, the determined identification information may correspond to the identification information determined by the central computing processor 108. The rendering of the identification information may be based on a combination of one or more of a video, an audio, one or more images, an animation, or a haptic feedback. The identification information corresponding to the video and/or one or more images may be rendered on the display screen of the electronic device 100. The identification information corresponding to the audio may be rendered by means of the audio interface of the electronic device 100.

The I/O unit 102 may be configured to receive first set of user inputs from a user associated with the electronic device 100. Such first set of user inputs may be received responsive to the rendered identification information. In an aspect, the first set of user inputs may correspond to a touch based input provided by the user on the display screen. In another aspect, the first set of user inputs may correspond to a voice based command provided by the user using the audio interface. In another aspect, the first set of user inputs may correspond to a request to disassemble a construction object and reassemble the building blocks to create one or more new construction objects. The communication module 104 may transmit the received first set of user inputs to the remote server. In an aspect, upon the rendering of the one or more instructions, the I/O module 102 may receive first set of user inputs for changing one or more parameters associated with the rendered identification information. The second set of user inputs correspond to one or more of changing frame rate of the rendered video, changing the size of the rendered image, changing one or more audio characteristics of the rendered audio, and the like.

Upon the rendering of the one or more instructions, the I/O module 102 may receive second set of user inputs for changing one or more parameters associated with the rendered one or more instructions. The second set of user inputs correspond to one or more of changing frame rate of the rendered video, changing the size of the rendered image, changing one or more audio characteristics of the rendered audio.

In an aspect, the I/O module 102 in conjunction with the image capturing module 106 may be configured to receive first set of user inputs corresponding to the identification of a plurality of building blocks. Such one or more inputs may be intended for creating a repository of identification information corresponding to each of the plurality of building blocks. In an aspect, when the central computing processor 108 locally determines the identification information, the repository may be maintained in the memory 110. In another aspect, when the identification information is determined by remote server.

Figure 2:
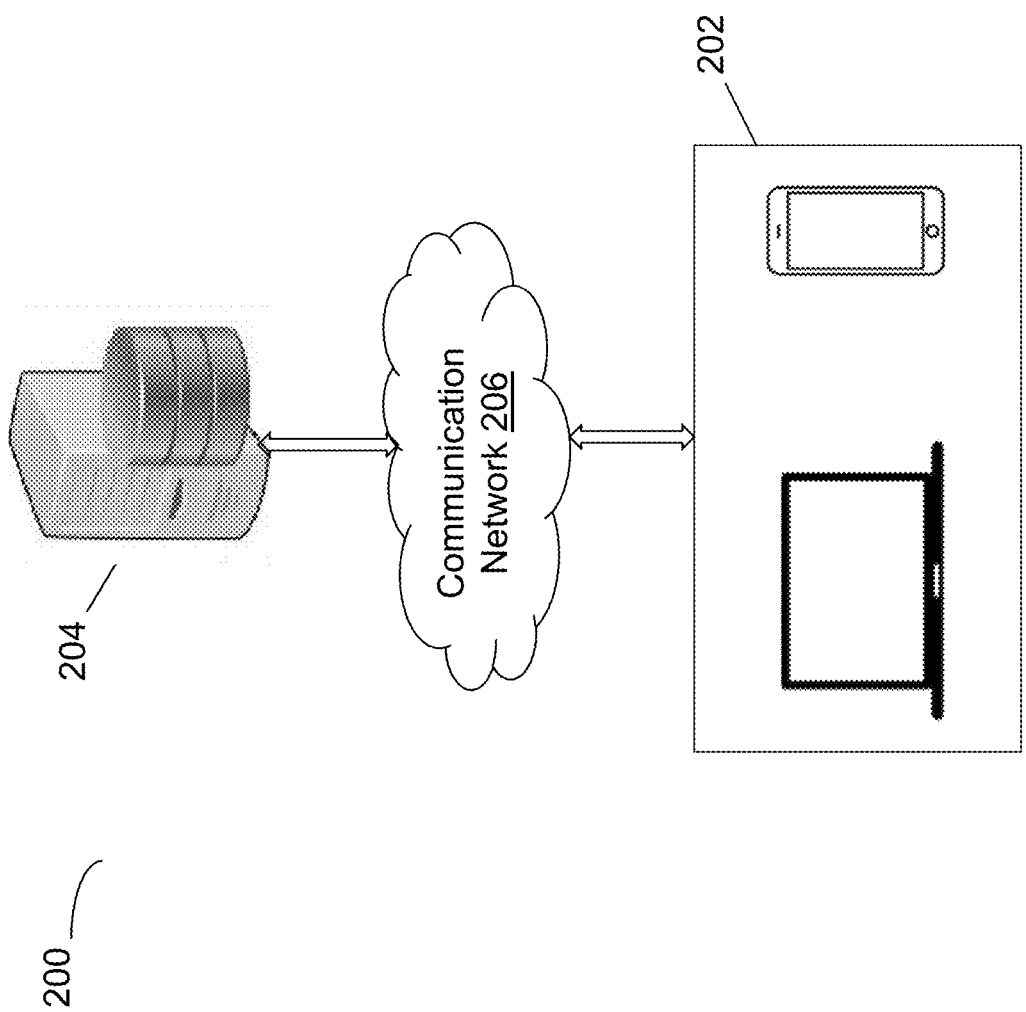
FIG. 2 illustrates a system for identifying building blocks and suggesting ways to assemble the identified blocks, according to an example embodiment.

FIG. 2 illustrates a system 200 for identifying building blocks and suggesting ways to assemble the identified blocks, according to an example embodiment. The system 200 comprises of an electronic device 202, at least one remote server 204, and a communication network 206. The electronic device 202 may be a device capable of communication and processing such as a Smartphone, or a laptop, or a tablet. One or more electronic devices 202 may be capable of being communicatively coupled with each other. The remote server 202 may be communicatively coupled with the one or more electronic devices 202. The electronic device 202 corresponds to the electronic device 100 disclosed in FIG. 1, and therefore incorporates all the comprising components and modules recited for the electronic device 100. The electronic device 202 may be configured to capture the one or more images of the building blocks that are to be identified. The captured image is transmitted to the remote server 204 for identification. The electronic device 202 may be further configured to render the received identification information to an associated user. The electronic device 202 may be further configured to receive first set of user inputs corresponding to the rendered identification information. The electronic device 202 may be further configured to receive and render the one or more instructions from the remote server 204 corresponding to the transmitted first set of user inputs.

The remote server 204 may correspond to a network entity that is configured to analyse the one or more images of the building blocks received from the electronic device 202. The remote server 204 may transmit the identification information of the one or more building blocks to the electronic device 202. The remote server 204 may further determine one or more instructions for constructing a desired constructions object, based on the received first set of user inputs corresponding to the identification information. The transmission and reception of the identification information, first set of user inputs, and the one or more instructions between the electronic device 202 and the remote server 204 may be facilitated by the communication network 206. Examples of the communication network 206 include, but are not limited to, the Internet, Wireless Fidelity (Wi-Fi) network, Wireless Local Area Network (WLAN), Local Area Network (LAN), Metropolitan Area Network (MAN), ZigBee, TCP/IP, Ethernet, Global System for Mobile Communication (GSM) network, Long Term Evolution (LTE) network, and/or Bluetooth (BT) communication protocols.

The electronic device 202 may capture one or more images of a building block which is to be identified. In an example embodiment, the electronic device 202 may capture one or more images of an assemblage of building blocks. In such a scenario, a user may intend to identify the plurality of building blocks constituting the assemblage in order to create a construction object. The capturing of the one or more images may be based on the image capturing module 106 that may include, but is not limited to, charged coupled devices (CCD), infrared imaging devices, electro-optical sensing devices. The captured one or more images may comprise a 2-dimensional (2D) image of the building block, a 3-dimensional image (3D), a bar code, a Quick Response (QR) code, Radio Frequency identification (RFID).

A person of ordinary skill in the art would understand that the image capturing module may be integrated with the electronic device 202. However, in an alternate embodiment, the image capturing module constitutes an imaging device separate from the electronic device, and which can be externally coupled to the electronic device 202.

It should be understood that one or more functions executed by the central computing processor may be performed by the remote server 204. In an example embodiment, the electronic device 202 may transmit the captured one or more images to the remote server 204 for identification, via the communication network 206. The remote server 204 may compare the received one or more images of the building blocks with one or more images stored at a database associated with the remote server 204. The remote server 204 may further determine identification information corresponding to the one or more building blocks based on the comparison and an image processing algorithm. It should be noted that there exist a number of image processing algorithms that may be utilized within the scope of the method steps described herein. For example, Sternberg et al. in the U.S. Pat. No. 6,763,148 titled "Image recognition methods", which is incorporated by reference herein in its entirety describes a method that sequentially examines candidate database images for their closeness of match in a sequential order determined by their a priori match probability. Other, image recognition algorithms as well known by people skilled in the art may be used without deviating from the novel aspects of the method described herein. The electronic device 202 may receive the determined identification information from the remote server 204.

In an alternate example embodiment, the electronic device 202 may locally compare the received one or more images of the building blocks with one or more images stored in an associated local database or a local memory. In an aspect, such one or more images used for comparison may be stored in the memory 110. The electronic device 202 may further determine identification information corresponding to the one or more building blocks based on the comparison and image processing algorithm stored in the memory 110. Upon determining the identification information the central computing processor 108 may identify the building block and further determine one or more instructions related to the identified block.

The received identification information may comprise information regarding an identity of the building block or the one or more building blocks constituting the assemblage of building blocks. The received identification information may further comprise information regarding one or more construction objects that can be constructed by assembling the building block, or the plurality of building blocks constituting the assemblage. The identification information may further comprise information regarding one or more structural arrangements for using the building block, or the plurality of building blocks constituting the assemblage. The identification information may further comprise one or more Universal Resource Locator (URL) address for retrieving more information regarding the building blocks, or the plurality of building blocks constituting the assemblage. The identification information may further comprise an alternative construction apart from the construction object being constructed by the user, based on the identification of the building block. In an aspect, the identification information may be a decode string that identifies the building block based on the one or more images of the building block and certain pre stored information.

In an aspect, the electronic device 202 may render the identification information on the display screen. The rendering of the identification information may be based on a combination of one or more of a video, an audio, one or more images, an animation, or a haptic feedback. The identification information comprising the video and/or one or more images may be rendered on the display screen of the electronic device 202. The identification information comprising the audio may be rendered based on the audio interface of the electronic device 202.

The electronic device 202 may be configured to receive first set of user inputs from a user. Such first set of user inputs may be received responsive to the rendered identification information. For example, when the identification information corresponds to a list of construction objects that can be assembled using the plurality of identified blocks of an assemblage, the first set of user input may correspond to an input to select a desired construction object from the rendered list. In another example, the first set of user inputs may correspond to an input to select a desired structural configuration for assembling a construction object. In another example, the first set of user inputs may correspond to a click on a provided hyperlink to retrieve more information regarding the building block, plurality of building blocks, and/or the one or more construction objects that can be assembled. In another aspect, the first set of user inputs may correspond to a request to disassemble a construction object and re-assemble the building blocks of the disassembled construction object to create one or more new construction objects.

In an aspect, the first set of user inputs may correspond to a touch based input provided by the user on the display screen. In an aspect, the first set of user inputs may correspond to a gesture based input, provided by the user such as a freeform gesture or shaking of the electronic device 202. In another aspect, the first set of user inputs may correspond to a voice based command provided by the user using the audio interface. In the aforementioned scenarios, the electronic device 202 may receive first set of user inputs that correspond to a request to change one or more parameters associated with the rendered one or more instructions. The first set of user inputs correspond to one or more of changing frame rate of the rendered video, changing the size of the rendered image, or changing one or more audio characteristics of the rendered audio.

The electronic device 202 may transmit the received first set of user inputs to the remote server 204, via the communication network 206. In an example embodiment, the remote server 204 may determine one or more instructions corresponding to the first set of user inputs received from the electronic device 202. In another example embodiment, the electronic device 202 may locally determine one or more instructions corresponding to the first set of user inputs received from the electronic device 202. The one or more instructions may correspond to directions for utilizing the building block for constructing a construction object.

In an aspect, the electronic device 202 may receive the determined one or more instructions from the remote server 204, via the communication network 206. Such received one or more instructions may be rendered on the electronic device 202. The rendering of the received one or more instructions may be based on a combination of one or more of a video, an audio, one or more images, an animation, or a haptic feedback. In an aspect, the one or more instructions correspond to one or more other building blocks of the identified plurality of building blocks that are to be used subsequent to the building block for constructing the construction objects. In an aspect, the one or more instructions correspond to a number or a type of building blocks required for assembling the desired construction object. In an aspect, the one or more instructions correspond to a sequence of using the identified building block or the identified the plurality building blocks, for assembling a desired construction object. In an aspect, the one or more instructions correspond to a number or a type of one or more construction objects that can be assembled using the identified building block or the identified plurality of building blocks. Based on the determined number and type of the identified building block or the identified plurality of building blocks, the one or more instructions may further correspond to a prompt to a user to buy a set of building blocks for assembling a desired construction object and include an e-commerce link to purchase the desired object. In another aspect, based on the determined number and type of the identified building block or the identified plurality of building blocks, the one or more instructions may further correspond to suggestions for assembling one or more other construction objects.

In an aspect, the electronic device 202 may receive second set of user inputs that correspond to a request for changing one or more parameters associated with the rendered identification information. The second set of user inputs correspond to one or more of changing frame rate of the rendered video, changing the size of the rendered image, changing one or more audio characteristics of the rendered audio.

In an aspect, the electronic device 202 may be configured to receive first set of user inputs corresponding to the identification of a plurality of building blocks. Such one or more inputs may be intended for creating a repository of identification information corresponding to each of the plurality of building blocks. In an aspect, when the electronic device 202 locally determines the identification information, the repository may be maintained in the memory 110. In another aspect, when the identification information is determined by remote server 204, the repository may be maintained at a database associated with the remote server 204.

Figure 3A:
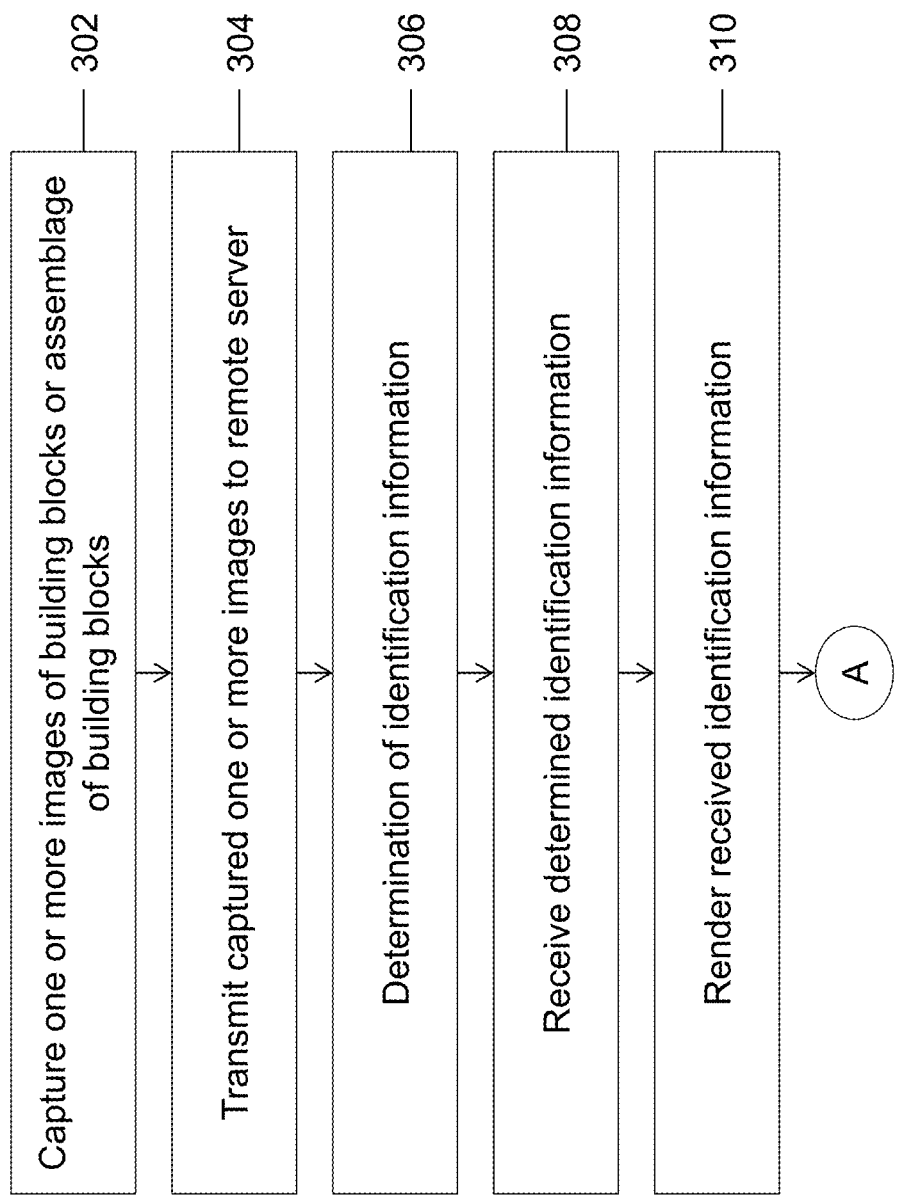
FIGS. 3A and 3B collectively illustrate a method for identifying building blocks and suggesting ways to assemble the identified blocks, according to an example embodiment.
Figure 3B:
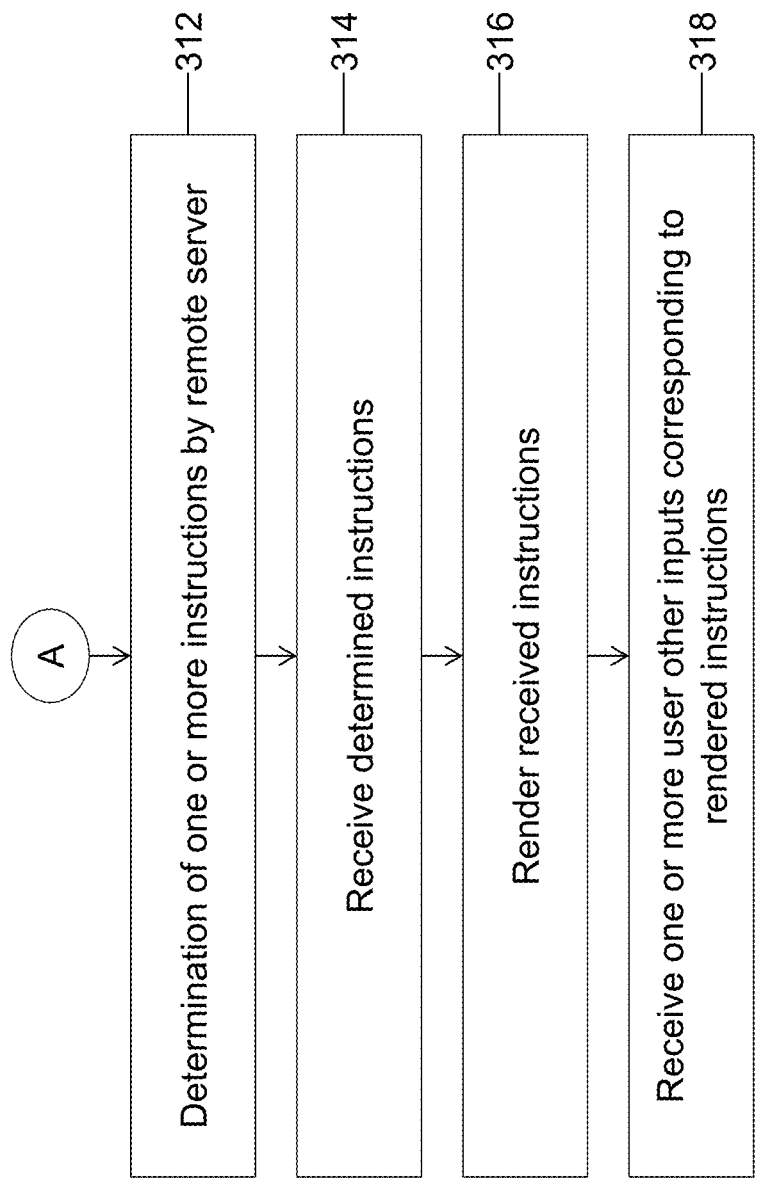

FIGS. 3A and 3B collectively illustrate a method for identifying building blocks and suggesting ways to assemble the identified blocks, according to an example embodiment. Further, FIGS. 3A and 3B comprise a flowchart 300 that is explained in conjunction with FIG. 1 and FIG. 2.

At step 302, one or more images of a building block or an assemblage of building block are captured by the image capturing module 106 of the electronic device 100. At step 304, the captured one or more images are transmitted for determination of identification information. In an aspect, the one or more images may first be utilized for determination of a decode string which is then transmitted to the remote server 204 by the communication module 104. In another aspect, the captured one or more images are provided to the central computing processor 108 for determination of identification information.

At step 306, identification information may be determined either by the remote server 204 or by the central computing processor 108. In an aspect, the identification information is determined by comparing the captured one or more images with the one or more images stored in an associated database of the remote server 204.

In an alternate embodiment, the determination of the identification information may be performed locally at the electronic device, by the central computing processor 108. Such a determination may be performed based on based on a comparison of the captured one or more images with the one or more images stored in an associated database or memory 110 of the electronic device, and analysis of the captured one or more images based on an image processing algorithm stored in the memory 110. Upon the identification of the building block, the central computing processor 108 may determine one or more instructions stored in the associated database or memory 110. These one or more instructions are then provided to the user by means of the I/O module 102. It should be clearly noted that according to such an embodiment there is no need for the electronic device to communicate with a remote server.

At step 308, the determined identification information may be received by the communication module 106. At step 310, the received identification information may be rendered on the electronic device 100, by the I/O module 102. At step 312, one or more instructions may be determined by the remote server 204 corresponding to the identification information related to the one or more building blocks. At step 314, the determined one or more instructions may be received by the communication module 104. At step 316, the received instructions may be rendered to the user, by the I/O module 102. Additionally, at step 318, a set of user inputs may be received by the I/O module 102 corresponding to the rendered one or more instructions.

The flow chart of FIGS. 3A and 3B shows the method steps executed according to one or more embodiments of the present disclosure. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIGS. 3A and 3B may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

Figures 4A, 4B:
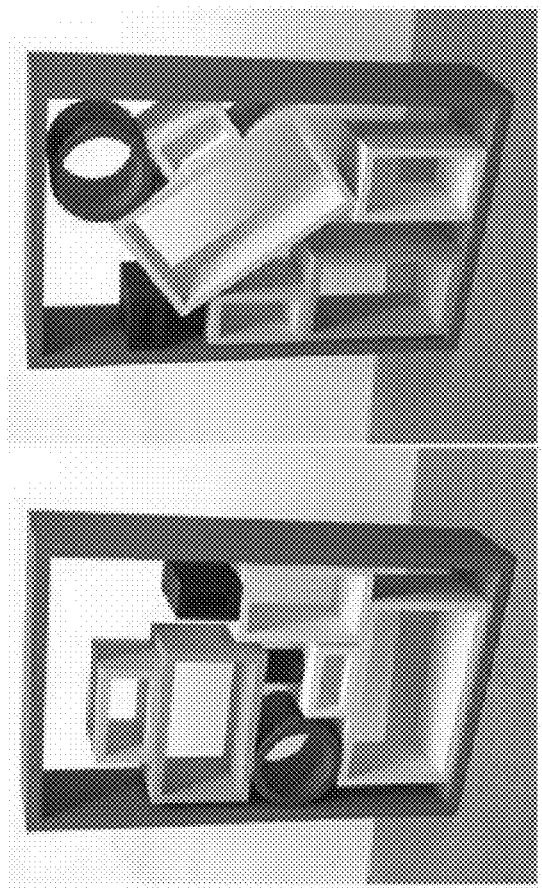
FIGS. 4A and 4B illustrate the various permutations of the building blocks based on the instructions received by the device.

FIGS. 4A and 4B illustrate the various permutations of the building blocks based on the instructions received by the device. FIG. 4A shows a first arrangement with a set of building blocks and FIG. 4B. shows a second arrangement with the same set of building blocks. Upon receiving identification information regarding one or more building blocks the method described herein may provide a user the option to select the arrangement that the user may require. Based on the selection of the arrangement required by the user, a set of instructions may be provided on the electronic device of the user to assemble the required arrangement.

The described system, electronic device, and method enable a user to develop desired structures such as a desired model, toy, building, and the like that are difficult to build without assistance. Specifically, in cases where there are a number of building blocks to be chosen from, a user might get confused. The described system, electronic device, and method enhance the user experience and may also increase the computational capability of a computing device having specific instructions for performing the specific task of creating one or more desired structures. Without the availability of the method described herein the user may not be able to create a desired structure even if the user has a conventional electronic device. Hence, the described method enables an electronic device to identify and suggest one or more additional building blocks that may be required for building the user desired structure and may also suggest one or more specific ways according to which a plurality of building blocks may be combined in a specific order.

The logic of the example embodiment(s) can be implemented in hardware, software, firmware, or a combination thereof. In example embodiments, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured mediums.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

Moreover, although the present disclosure and its advantages have been described in detail, it should be understood that various changes, substitutions and alterations can be made herein without departing from the disclosure as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A system for identifying a building block and suggesting ways to assemble the identified block, comprising:
   an electronic device configured to;
   capture one or more images of at least one building block;
   determine an identification information corresponding to the building block;
   display one or more instructions for utilizing the building block;
   a processing module being communicatively coupled with the electronic device, the processing module configured to;
   receive the identification information corresponding to the building block;
   identify the building block based on the received identification information by comparing the identification information related to the one or more images with the identification information pre-stored in a memory;
   determine;
   a first one or more instructions for utilizing the one or more building blocks;
   a second one or more instructions corresponding to one or more other building blocks to be used with the identified building block; and
   transmit the first one or more instructions and the second one or more instructions for utilizing the building block to the electronic device.

2. The system of claim 1, wherein the electronic device comprises an image capturing module, the image capturing module being adapted to capture the one or more images.

3. The system of claim 1, wherein the captured one or more images comprise one or more of: a 2-dimensional image of the building block, or a 3-dimensional image of the building block, or a bar code incorporated on the building block, or a Quick Response (QR) code, or a Radio Frequency identification (RFID).

4. The system of claim 1, wherein the identification information comprises of a decode string.

5. The system of claim 1, wherein the second one or more instructions for utilizing the building block comprise:
   a list of one or more objects that can be built using the identified the building block and the one or more building blocks.

6. The system of claim 1, wherein the processing module is a processor contained in the electronic device.

7. The system of claim 6, wherein the processor is communicatively coupled with a memory, the memory adapted to store identification information for building blocks for identification of building blocks.

8. The system of claim 1, wherein the processing module is a remote server, the remote server being communicatively coupled to the electronic device communicates and adapted to identify the building block and send information back to the electronic device.

9. The system of claim 1, wherein the user provides user input to direct and identify the building block.

10. The system of claim 1, wherein the building block is Lego or Megablocks.

11. The system of claim 1, wherein the building block is a toy.

12. The system of claim 8, wherein the remote server is communicatively coupled with a database, the database adapted to store identification information for the building block for identification of building blocks.

13. A method for identifying building blocks and suggesting ways to assemble the identified blocks, said method comprising:
    receiving, by a central computing processor, one or more images of a building block captured using an image capturing device;
    determining, by the central computing processor, an identification information related to the building block based on the captured one or more images;
    identifying, by the central computing processor, the building block based on a prestored identification information within a memory;
    determining, by the central computing processor, one or more instructions for utilizing the building blocks and one or more other building blocks to be used with the identified building block; and
    transmitting, by the central computing processor, to a display screen of an electronic device the one or more instructions for utilizing the building block.

14. The method of claim 13, wherein the building block is Lego blocks or Megablocks.

15. The method of claim 13, wherein the building block is a toy.

16. The method of claim 13, wherein the captured one or more images comprise one or more of: a 2-dimensional image of the building block, a 3-dimensional image of the building block, a bar code incorporated on the building block, a Quick Response (QR) code, or a Radio Frequency identification (RFID).

17. The method of claim 13, wherein the received one or more instructions provided on the electronic device is any one or more of a video, an audio, an image, or a haptic output.

18. The method of claim 13, wherein the received one or more instructions comprise information including: a sequence of the one or more other building blocks for constructing a construction object, one or more other construction objects that can be assembled using the identified building block, a number or a type of building blocks required for assembling a construction object, a number or a type of one or more construction objects that can be assembled using an identified building block, a prompt to a user to buy a set of building blocks for assembling a construction object, suggestions for assembling one or more other construction objects.

19. The method of claim 13, further comprising receiving a set of user inputs, through an I/O module, the user inputs comprising one or more of selecting an object to be built, changing frame rate of the video, changing the size of the image, and changing one or more audio characteristics of the audio.

20. The method of claim 13, wherein the identification information comprises of a decode string.

21. The method of claim 13, wherein the building block are identified by the electronic device by comparing the identification information related to the one or more images with the identification information pre-stored in a memory communicatively coupled with the electronic device.

22. The method of claim 13, wherein the building block is identified by a remote server by comparing the identification information related to the one or more images with the identification information pre-stored in a database communicatively coupled with the remote server.

23. The method of claim 13, further comprising receiving user input corresponding to a request to disassemble a construction object and re-assemble plurality of building blocks to create one or more other construction objects.

24. The method of claim 23, further comprising transmitting identification of the building blocks to the remote server for creating a repository of the identification information of the plurality of building blocks.

25. An electronic device for identifying building blocks and suggesting ways to assemble the identified blocks, said electronic device comprising:
    an image capturing module that captures one or more images of a building block;
    a communication module that transmits an identification information related to the building block based on the captured one or more images;
    a central computing processor that identifies the building block by comparing the identification information related to the one or more images with the identification information pre-stored in a memory communicatively coupled with the electronic device; and
    determine one or more instructions for utilizing the building blocks and one or more other building blocks to be used with the identified building block; and
    an input/output (I/O) module to display the instructions corresponding to the building block.

26. The electronic device of claim 25, wherein the electronic device is selected from the group consisting of a Personal Digital Assistant (PDA) device, a personal computer, a laptop, and a mobile phone.

27. The electronic device of claim 25, wherein the image capturing module is selected from the group consisting of a charged coupled device (CCD), an infrared imaging device, and an electro-optical sensing device.

28. The electronic device of claim 25, wherein the one or more instructions for utilizing the building block comprise one or more of:
    instructions for a set of building blocks required for combining with an individual identified building block, or a list of one or more objects that can be built using the identified one or more building blocks.

* * * * *